Sept. 8, 1964   V. D. KAPTUR, JR., ETAL   3,147,617
ACCOMMODATION CHECKING DEVICE
Filed Feb. 6, 1961   3 Sheets-Sheet 1
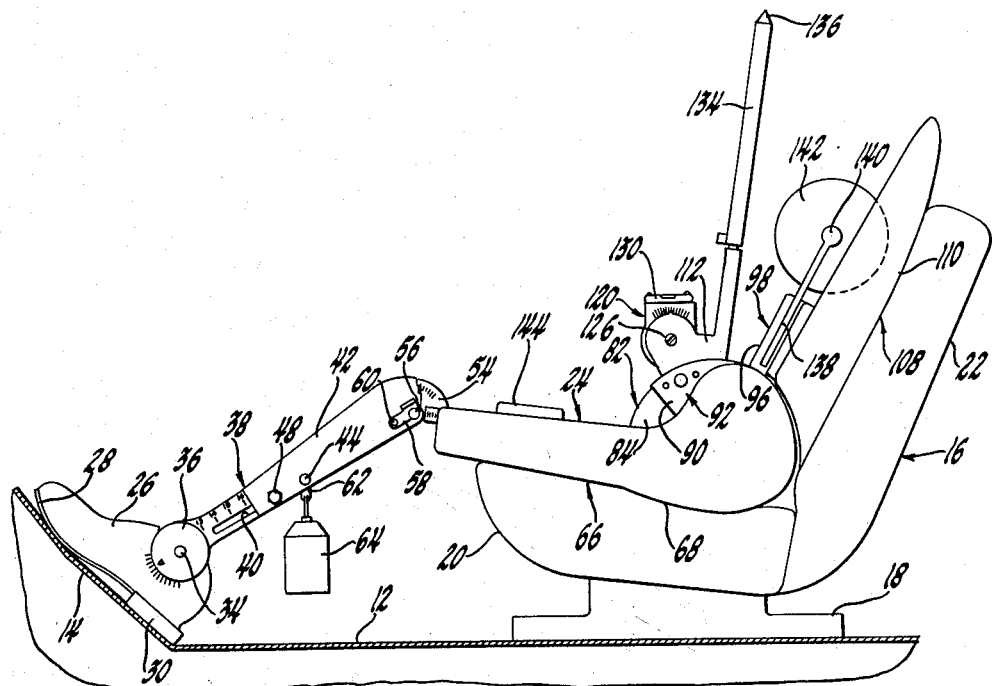
Fig.1
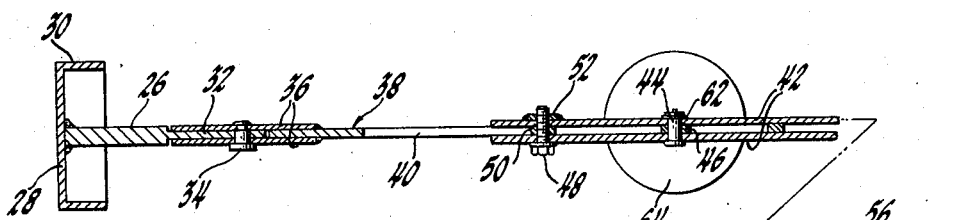
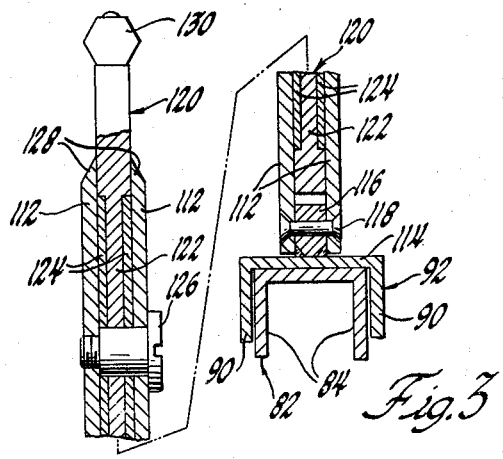
Fig.3
Fig.2
INVENTORS
Vincent D. Kaptur, Jr.
John F. McCabe, &
BY Michael C. Myal
Herbert Furman
ATTORNEY

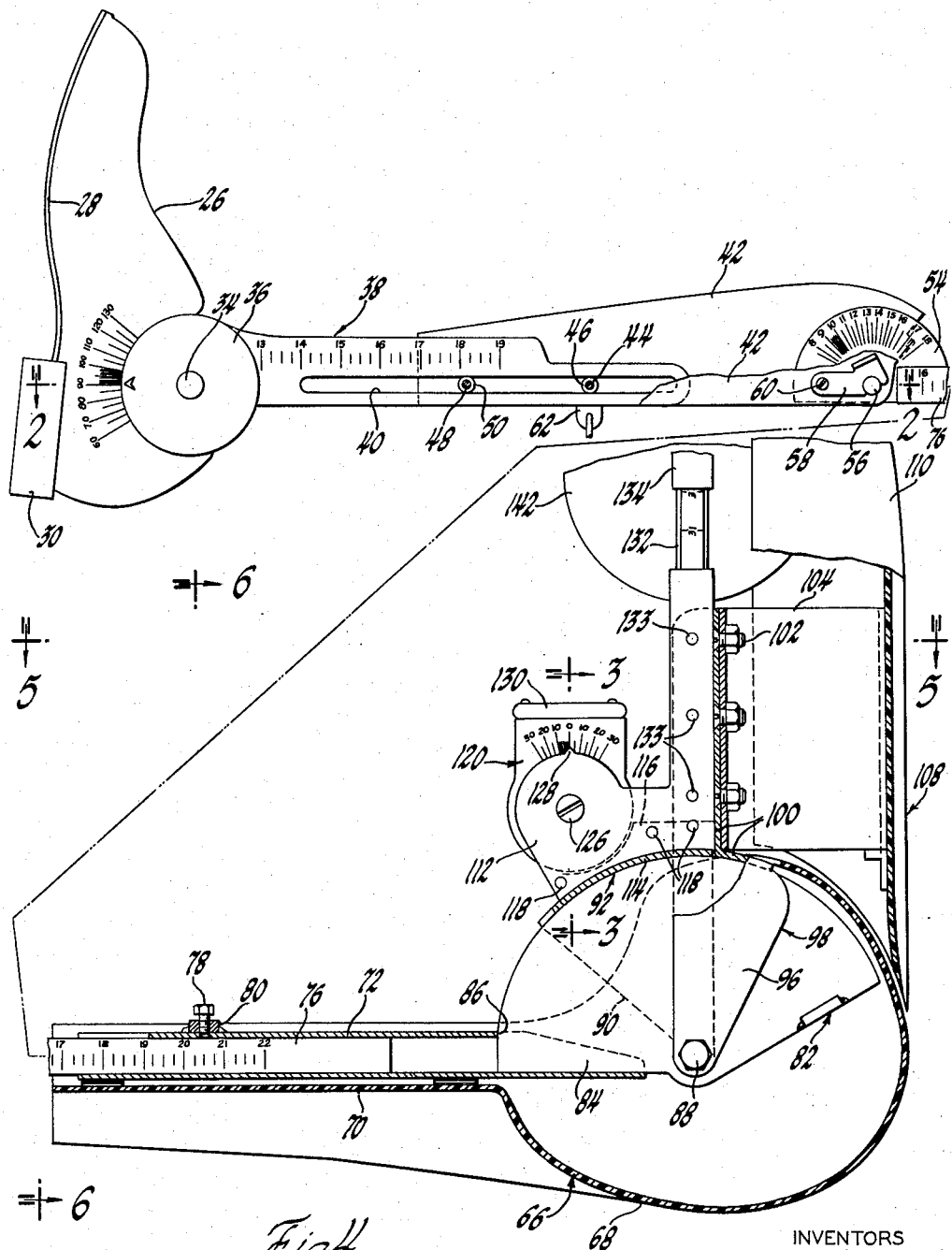

Sept. 8, 1964 V. D. KAPTUR, JR., ETAL 3,147,617
ACCOMMODATION CHECKING DEVICE
Filed Feb. 6, 1961 3 Sheets-Sheet 3

INVENTORS
Vincent D. Kaptur, Jr.
John F. McCabe, &
BY Michael C. Myal

Herbert Furman
ATTORNEY

United States Patent Office 3,147,617
Patented Sept. 8, 1964

3,147,617
ACCOMMODATION CHECKING DEVICE
Vincent D. Kaptur, Jr., Birmingham, and John F. McCabe and Michael C. Myal, Warren, Mich., assignors to General Motors Corporation, Detroit, Mich., a corporation of Delaware
Filed Feb. 6, 1961, Ser. No. 87,371
13 Claims. (Cl. 73—172)

This invention relates to an accommodation checking device and more particularly to a device representing or simulating certain segments of a predetermined human body in order to determine whether a vehicle body and a seat included therein are satisfactory for the accommodation and comfort of the occupants thereof.

In the preferred embodiment of this invention, the device represents or simulates certain segments of a human body lying in a particular percentile in weight and a particular percentile in stature. The device is adapted to be positioned on a vehicle seat within a vehicle body in order to determine whether certain body and seat dimensions or measurements and certain seat locations are satisfactory for the accommodation and comfort of the occupants thereof included within a particular range of weight and a particular range of stature.

The primary object of this invention is to provide a new and improved accommodating checking device. Another object of this invention is to provide a new and improved accommodation checking device representing or simulating certain segments of a predetermined human body. A further object of this invention is to provide a new and improved accommodation checking device adapted to be positioned within a vehicle body in order to determine whether certain body dimensions or measurements and certain seat locations are satisfactory for occupant comfort.

These and other objects of the invention will be readily apparent from the following specification and drawings wherein:

FIGURE 1 is a partial side elevational view of a vehicle body having a seat mounted therein and an accommodation checking device according to this invention positioned on the seat within the body;

FIGURE 2 is a sectional view taken generally along the plane indicated by line 2—2 of FIGURE 4;

FIGURE 3 is an enlarged sectional view taken generally along the plane indicated by line 3—3 of FIGURE 4;

FIGURE 4 is an enlarged partially broken away view of a portion of FIGURE 1;

Figure 5:
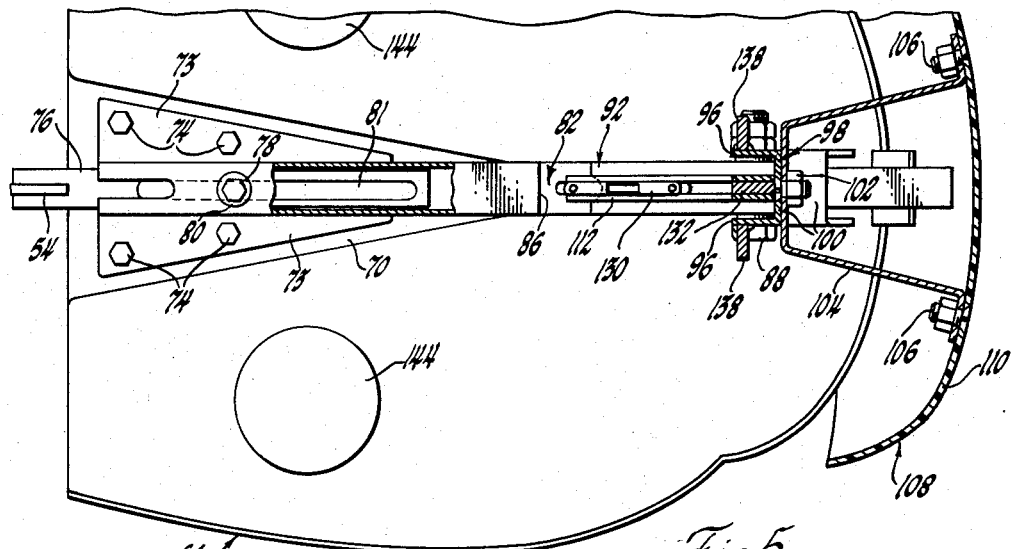
FIGURE 5 is a partially broken away view taken generally along the plane indicated by line 5—5 of FIGURE 4.

Referring now to FIGURE 1 of the drawings, a vehicle body 10 includes a floor pan 12 which includes a toe pan or toe board 14 adjacent the front end thereof. A vehicle seat 16 is mounted on the floor pan 10 by suitable adjustable mounting means 18 and includes a seat cushion 20 and a seat back 22. The construction of the seat cushion and the seat back form no part of this invention, although it will be understood that both are of the compressible type so as to resiliently support a human body when the passenger or operator of the vehicle is seated thereon. An accommodation checking device 24 according to this invention is positioned on the seat 16, as shown, in order to determine whether the seat 16 and the body 10 are suitable for accommodation and comfort of a known predetermined human body. In the specific device shown, the device simulates or represents a human male who is 50th percentile in weight and 90th percentile in stature, hereinafter referred to as the "predetermined male." A human male such as this has a weight of approximately 167 pounds and the device 24 weighs 162 pounds with all weights mounted thereon. The 5-pound difference is allowed in order to take care of the weight of the occupant's arms on the vehicle steering wheel or other factors which support part of the weight of the human occupant other than the vehicle seat.

Referring now particularly to FIGURES 1, 2, and 4 of the drawings, the device 24 includes a member 26 shaped to conform to the centerline cross sectional shape of a shoe and having secured thereto a lateral sole member 28 including a box-like heel member 30 of a shoe. The members 26, 28 and 30 represent or simulate a shoe worn by the predetermined male. The member 26 includes a generally circular shaped extension portion 32 of reduced thickness which is pivoted by stud 34 between a pair of circular discs or members 36 secured to a lower leg member 38. It will be noted that the discs 36 include an arrow which may be positioned with respect to angular delineations on each side of the member 26. The stud 34 represents the angle joint of the predetermined human male and the arrows on the discs 36 can be set with respect to the angular delineations on the member 26 to indicate the barefoot angle between the foot and the lower leg portion of the predetermined human male. The weight of the members 26, 28 and 30 represents the weight of two feet and two shoes of the 50th percentile human male in the United States.

The lower leg member 38 is slotted at 40 and is slidably received between a pair of lower leg members 42. A guide pin 44 extends between the members 42 through the slot 40 and mounts a circular washer 46 received within slot 40. A bolt 48 also extends between the members 42 through the slot 40 and mounts a circular washer 50 received within slot 40. Bolt 48 is adjustably threaded into a nut 52 secured to one of the members 42. Both the guide pin 44 and the bolt 48 and their respective washers 46 and 50 provide for sliding movement of the member 38 relative to the members 42, with the bolt further providing a means for adjustably fixing the relationship of these members. The members 38 and 42 represent the lower leg of the predetermined human male. A semi-circular member 54 is received between the members 42 and is pivoted thereto by means of a removable shouldered stud 56. Member 54 is marked off in angular degrees on each side thereof and the relationship between the rear edges of members 42 and member 54 determines the angular relationship therebetween. Stud 56 is secured in place by a hook member 58 pivoted at 60 to one of the members 42 and having the hooked end received within an annular groove in the member 56. The stud 56 represents the knee joint of the predetermined human male and the distance between the centerlines of the studs 34 and 56 represents the lower leg link length of the predetermined human male by means of the bolt 48. The member 38 is marked in numerals on each side thereof in order to set the lower leg length by positioning the ends of members 42 with respect to the numerals. An apertured bracket 62 pivotally mounted on the stud 44 to one side of the members 42 supports a weight 64. The resultant weight of weight 64, members 38 and 42 and associated parts corresponds to the weight of both lower legs of the predetermined human male from the knee joint to the ankle joint. The weight 64 is so located that the resultant center of gravity corresponds to the center of gravity of the lower legs of the predetermined human male.

A seat pan 66 has the lower outer surface 68 thereof shaped to conform to the lower surface of the upper leg portions or thighs and buttocks of the predetermined human male. The seat pan 66 includes a central upwardly offset flattened portion 70 of generally triangular shape when viewed in plan and a generally square shaped tubular member 72 is positioned on the portion 70 and secured thereto by opposite brackets 73 bolted at 74 to the portion 70 of the seat pan. A generally U-shaped member 76 is slidably mounted within the member 72 and has the forward end thereof secured to the member 54. As best shown in FIGURE 4, a bolt 78 threaded into a nut 80 fixed to the upper wall of the member 72 and bearing against a depressed groove 81 of member 76 adjustably fixes the slidable relationship of the members 72 and 76.

A member 82 of U-shaped cross section has the sector-like legs 84 thereof received within the rearward end of the member 72 and suitably secured thereto, the upper wall of the member 72 being cut away at 86 so as to receive the legs 84. The sector-like legs 90 of a U-shaped member 92, which straddles the member 82, and the legs 96 of a U-shaped member 98 are interconnected by a bolt 88. The pivot 88 represents the hip joint of the predetermined human male. The distance between the centerline of pivot 88 and the centerline of pivot 56 represents the upper leg link length of the predetermined human male, with this length being set by fixing the slidable position of the members 72 and 76 with respect to each other by means of the adjustable bolt 78. It will be noted that the sides of member 76 include numerical delineations which can be positioned with respect to the forward end of member 72.

The legs 96 of the member 98 are interconnected by a base or web 100 which is bolted at 102 to the base of a generally U-shaped bracket 104. The legs of bracket 104 include flanged ends which are bolted at 106 to a back pan 108, the rear outer surface 110 of which is shaped to conform to the contour of the outer surface of the back of the predetermined human male. The pivot 88 thus further provides a pivotal connection between the seat pan 66 and the back pan 108.

A pair of generally L-shaped members 112 are secured to the web 114 interconnecting the legs 90 of member 92 and are spaced apart by a spacer member 116 riveted at 118 to the members 112. As best shown in FIGURE 3, a member 120 is received between the members 112 and includes a circular portion 122 of reduced thickness, with friction washers 124 being located between the portion 122 and the inner surfaces of the members 112. Members 112, washers 124 and the portion 122 of member 120 are pivotally secured together at 126. Upon reference to FIGURE 4, it will be noted that the member 120 is marked off in angular degrees on each side thereof and that the members 112 include pointers 128 to register with the numerals on the member 120. The upper flattened surface of the member 120 mounts a spirit level 130 of known construction, the details of which are not shown.

A generally rectangularly shaped member 132 extends upwardly from between the members 112, being riveted thereto at 133. The member 132 is marked off in inches, as shown in FIGURE 4, and a hollow, generally rectangularly-shaped tubular member 134 is slidably received on member 132. The upper end of the member 134 terminates in a generally pyramidical-shaped probe 136, as best shown in FIGURE 1.

Figure 6:
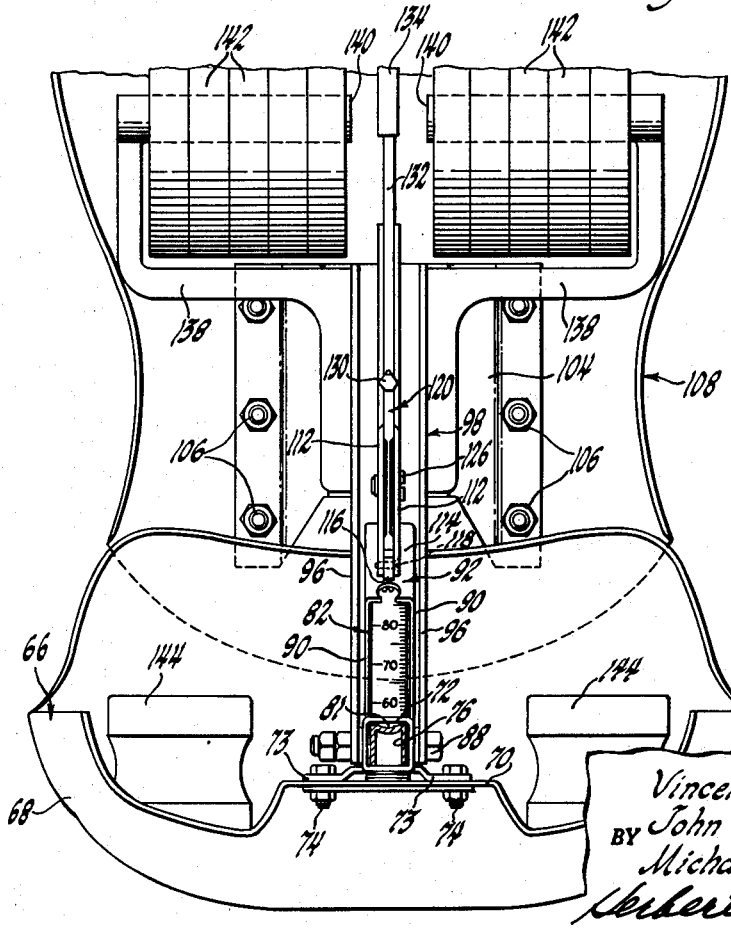
FIGURE 6 is a view taken generally along the plane indicated by line 6—6 of FIGURE 4.

A pair of angular brackets 138, FIGURE 6, extend from the legs 96 of member 98 and include pins 140 adapted to support removable weights 142. The weights 142 are added to the back pan 108 so that the resultant weight of the back pan, its associated members, and weights 142 correspond to the weight of the upper part of the body of the predetermined human male, from the hips through the head thereof, inclusively. The weights 142 are so located that the resultant center of gravity corresponds to that of the upper part of the body of the predetermined human male. Further removable weights 144 are added to the seat pan 66 so that the resultant weight of the seat pan, its associated members and weights 144 correspond to the weights of the upper parts of the legs of the predetermined human male, weights 144 are positioned on the seat pan 66 so that the center of gravity of the resultant assembly corresponds to the known center of gravity of the upper parts of the legs of the predetermined human male.

In order to check whether certain body and seat dimensions or measurements and certain seat locations are adequate for occupant comfort, the lower leg and foot unit, including the leg members 38 and 42, and the members 26, 28 and 30, is removed as a unit by releasing member 58 and withdrawing stud 56 and the device 24 is then positioned on the seat 20, as shown in FIGURE 1. The lower leg unit is then added by inserting stud 56 through members 54 and 42 and locking it in place by member 58 and the weight 64 is then added. The sole member 28 and heel member 30 are then positioned in engagement with the toe pan 14 adjacent junction of the toe pan with the floor pan 12. Prior to initially positioning the device 24 within the body on the seat 20 and prior to adding the lower leg unit, the leg member 38 and the leg members 42 are preset to the known lower leg link length of the predetermined human male, and the leg members 72 and 76 are set to the known upper leg link length of the predetermined human male. If the sole member 28 and heel member 30 are not initially positioned as shown in FIGURE 1, the member 26 is rotated about stud 34 and the members 38 and 42 are rotated as a unit about stud 56 until the members 28 and 30 are positioned as shown or approximately as shown. The pointers on the discs 36 will then be set with respect to the angular delineations on the member 26, and the rear edges of the members 42 will then be set with respect to the angular delineations on the member 54 so that the angular relationship between the member 26 and a line extending between the centerlines of studs 34 and 56, and the angular relationship between a line extending between the centerlines of studs 34 and 56 and a line extending between the center lines of stud 56 and pivot 88 can be respectively read. If these angular relationships do not fall within the known ranges of angular relationships between the foot and lower leg and between the lower leg and upper leg of the predetermined human male best suited for his comfort, then it is known that the seat 16 must be repositioned either horizontally or vertically or both horizontally and vertically or that the compressibility of the seat cushion 20 and seat back 22 must be changed until the angular relationships read from the device 24 fall within their respective known ranges best suited for the comfort of the predetermined human male. It might be noted here that vehicle seats are usually of the adjustable type and that the relationship of the seat to the body may be checked at various adjustments of the seat.

Upon reference to FIGURE 6, it will be noted that the web of the member 82 is marked off in angular delineations. When the members 92 and 112 are rotated about bolt 88 until the members 112 engage the base 100 of member 98 as shown in FIGURE 4, the relationship of the forward edge of the web 114 of member 92 to the angular delineations on the web of member 82 indicates the angular relationship between a line extending between the center lines of the pivots 88 and 56 and a line tangent to the small of the back, which line would follow the outer surface 110 of the back pan 108 along the vertical centerline thereof. This angular relationship may be called the hip joint angle, and the range of hip joint angles best suited for the comfort of the predetermined human male is known. If the angular relationship read from the device 24 does not fall within the range of angular relationships best suited for the comfort of the predetermined human male, then it is known that either the compressibility of this seat should be changed or that the angular relationship between the seat cushion and seat back should be changed.

In order to measure the angle between a straight vertical line and a line tangent to the small of the back of the predetermined human male, the members 92 and 112 are rotated about bolt 88 until the members 112 engage the base 100 of member 98, as previously described, and the member 120 is rotated about pivot 126 until the spirit level 130 is parallel with the horizontal, whereby the pointers 128 indicate this angle by reference to the zero angle delineation on member 120. This angle can be compared with a known predetermined range of angles best suited for the comfort of the predetermined human male.

In order to measure available space between the depressed seat cushion contour and the roof of the vehicle body, not shown, the member 120 is rotated counterclockwise about the pivot 126 until the pointers 128 align themselves with the 8° delineation on the member. The members 92 and 112 are thereupon rotated about the pivot 88 until the spirit level 130 is parallel with the horizontal. The member 134 is thereupon extended with respect to the member 132 until the probe 136 engages the roof of the vehicle. The relationship of the lower edge of the member 134 to the numerical delineations on the member 132 indicates the available space between the depressed seat cushion contour and the roof of the vehicle body along a line extending 8° to the vertical and passing through the centerline of pivot 88. If such available space does not fall within the range best suited for the comfort of the predetermined human male, then the compressibility of the seat cushion 20 must be changed or the roof of the vehicle body must be raised.

It is contemplated that the device 24 be made of lightweight material, such as by manufacturing the various parts thereof out of aluminum and manufacturing the seat pan and the back pan out of fiber glass.

The device 24 is also useful in comparing various vehicle body styles with respect to each other to determine which body style most closely approximates the ideal accommodation for the predetermined human male.

Although the specific device shown represents or simulates the human male in the 50th percentile in weight and the 90th percentile in stature, it is believed apparent that the device 24 can be set so as to indicate other males or females lying in other weight percentiles and stature percentiles. Most adjustments necessary are already provided for by the adjustability of the various members of the device. However, the positions of the weights 64, 144 and 142 must be changed, and accordingly, the mounting bracket 62 and the brackets 138 would have to be made adjustable for this purpose.

By releasing the hook member 58 from the stud 56, the stud 56 can be withdrawn so as to partially disassemble the device 24. This provides for ease of transportation of the device.

Thus, this invention provides a new and improved accommodation checking device.

What is claimed is:

1. An accommodation checking device adapted to be positioned on a vehicle seat within a vehicle body comprising, in combination, a seat pan having the outer surface thereof shaped to conform to the lower surface of the upper leg segments of a predetermined human body, a back pan having the outer surface thereof shaped to conform to the back surface of the upper body segment of said predetermined human body, first pivot means pivotally interconnecting said seat pan and said back pan for rotational movement of each relative to the other, said first pivot means being located at the hip joint of said predetermined human body, means simulating the lower leg segment of said predetermined human body, and second means pivotally interconnecting said last mentioned means and said seat pan one of said pivot means including angle measuring means to determine a range of angular relationships relative to the accommodation and comfort of said predetermined human body.

2. An accommodation checking device as recited in claim 1, wherein said second pivot means is located at the knee joint of said predetermined human body.

3. An accommodation checking device as recited in claim 1, wherein a foot segment is pivotally secured to said lower leg segment at a location corresponding to the angle joint of said predetermined human body.

4. An accommodation checking device as recited in claim 1, wherein means are provided for measuring the angular delineation of said outer surface of said back pan with respect to the vertical.

5. An accommodation checking device as recited in claim 1, wherein means are provided to simulate the upper leg segment of said predetermined human body, and said second pivot means includes means for measuring the angular delineation between said lower leg segment and said upper leg segment.

6. An accommodation checking device as recited in claim 1, wherein means are provided to simulate the upper leg segment of said predetermined human body, and said first pivot means includes means for measuring the angular delineation between a line tangent to said outer surface of said back pan and said upper leg segment.

7. An accommodation checking device as recited in claim 1, wherein said seat pan includes adjustable means for setting the upper leg link length of said predetermined human body.

8. An accommodation checking device as recited in claim 1, wherein said means simulating said lower leg segment includes means for setting the lower leg link length of said predetermined human body.

9. An accommodation checking device as recited in claim 1, wherein means are provided for measuring the distance between the depressed seat cushion contour and the roof of the vehicle body at a predetermined angular delineation of said back pan with respect to the vertical.

10. An accommodation checking device as recited in claim 1, wherein weight means are provided on said seat pan whereby the weight of said seat pan corresponds to the weight of the upper parts of the legs of said predetermined human body.

11. An accommodation checking device as recited in claim 1, wherein weight means are provided for said back pan whereby the weight of the back pan corresponds to the weight of the upper part of said predetermined human body from the hips through the head thereof.

12. An accommodation checking device as recited in claim 10, wherein said weight means are so located that the resultant center of gravity corresponds to the center of gravity of the upper parts of the legs of said predetermined human body.

13. An accommodation checking device as recited in claim 11, wherein said weight means are so located that the resultant center of gravity corresponds to the center of gravity of said upper part of said predetermined human body.

References Cited in the file of this patent

UNITED STATES PATENTS 2,121,212    Ramsdell  ---------------- June 21, 1938
2,359,318    Lay et al.  ---------------- Oct. 3, 1944

OTHER REFERENCES

Publication: "Radiation Equivalent Manikin," Alderson Research Labs., Inc., Long Island City, N.Y., pages 1–15. Copy received September 27, 1960.

UNITED STATES PATENT OFFICE
CERTIFICATE OF CORRECTION

Patent No. 3,147,617 September 8, 1964

Vincent D. Kaptur, Jr., et al.

It is hereby certified that error appears in the above numbered patent requiring correction and that the said Letters Patent should read as corrected below.

Column 4, line 2, for "weights" read -- weight --; column 5, line 9, for "angle", first occurrence, read -- angular --; column 6, line 11, for "angle" read -- ankle --.

Signed and sealed this 12th day of January 1965.

(SEAL)
Attest:

ERNEST W. SWIDER
Attesting Officer

EDWARD J. BRENNER
Commissioner of Patents